(12) United States Patent
Litman (10) Patent No.: US 10,870,059 B1
(45) Date of Patent: Dec. 22, 2020

(54) REDUCED SKILL, SHORT-TERM FANTASY SPORTS METHOD AND SYSTEM

(71) Applicant: Mark A. Litman, Edina, MN (US)

(72) Inventor: Mark A. Litman, Edina, MN (US)

( * ) Notice: Subject to any disclaimer, the term of this patent is extended or adjusted under 35 U.S.C. 154(b) by 0 days.

(21) Appl. No.: 16/587,017

(22) Filed: Sep. 29, 2019

(51) Int. Cl.
*A63F 13/828* (2014.01)
*G07F 17/32* (2006.01)
*G06Q 50/34* (2012.01)

(52) U.S. Cl.
CPC .......... *A63F 13/828* (2014.09); *G06Q 50/34* (2013.01); *G07F 17/3209* (2013.01); *G07F 17/3225* (2013.01); *G07F 17/3272* (2013.01); *G07F 17/3288* (2013.01)

(58) Field of Classification Search
CPC ... A63F 13/828; G06Q 50/34; G07F 17/3209; G07F 17/3225; G07F 17/3272; G07F 17/3288
USPC ......................................................... 463/42
See application file for complete search history.

(56) References Cited

U.S. PATENT DOCUMENTS

| | | | | |
|---|---|---|---|---|
| 7,618,312 B1* | 11/2009 | Kasten | ..................... | A63F 13/12 463/7 |
| 2012/0149473 A1* | 6/2012 | Moore | ................ | G07F 17/3237 463/42 |
| 2014/0004939 A1* | 1/2014 | Kasten | ..................... | A63F 13/00 463/30 |
| 2014/0031105 A1* | 1/2014 | Givant | ................ | G07F 17/3276 463/25 |
| 2017/0319970 A1* | 11/2017 | Thorman | ................ | A63F 13/65 |

* cited by examiner

*Primary Examiner* — Allen Chan
(74) *Attorney, Agent, or Firm* — Mark A. Litman & Associates, P.A.

(57) ABSTRACT

A method of executing a sports fantasy wagering event among multiple players executed through player terminals to one or more servers, each of the player terminals comprising:
  one or more processors;
  player input controls;
  a communications component to connect the player terminal to a gaming platform running on the one or more servers;
  wherein the sports fantasy event is a single player game competing against multiple other single players that is dependent upon verifiable sports event outcomes in sports events;
  wherein each of the players select individual sports players or sports team performances, even if other ones of the multiple players have selected same individual sports players or sports team performances; and
  the one or more servers generate an amended point outcome based on reducing numbers of points awarded to each of the multiple players inversely based on numbers of the players having selected any identical performance.

19 Claims, 4 Drawing Sheets

REDUCED SKILL, SHORT-TERM FANTASY SPORTS METHOD AND SYSTEM

BACKGROUND OF THE ART

1. Field of the Invention

The present invention relates to the field of sports wagering and especially the field of sports fantasy wagering.

2. Background of the Invention

A "fantasy sport" is a game in which participants select a number of real-world players from a one or more real-world teams in a sports league and compete against other fantasy participants based on the performance statistics generated by the real-world players in real-world games. Fantasy sports may be played with pen and paper, but increasingly, online services and software allow participants to more easily select their teams, track the performance of their players, and tally their results. The ease of use of these online services removes much of the drudgery of tracking fantasy-sport statistics and has thereby caused the popularity of fantasy sports to skyrocket.

Even so, however, participation in a fantasy-sports league is a long-term endeavor stretching out over an entire sports season, which can last six months or more. Participants in fantasy-sports league may grow weary of it and quit before the season is over; other people may choose not to participate at all. A need therefore exists for a way to provide the interest and thrill of participation in a fantasy-sports league without the long-term time and energy commitment. Part of the exhaustion among the participants is the fact that significant changes in team rosters are difficult from week to week, and frustration can build up with an underperforming team or an underperforming player.

Additionally, traditional sports fantasy competitions are limited by the number of real-life sports players, as participants typically have different players at each position, without participants duplicating selections on individual players. This leads to significant disparities in teams, even with rotation of selections during a drafting phase.

Typical fantasy sports rules may be described as follows.

1. Each player or groups of players on a single gaming team must file their team entries in a timely manner.

2. Team Names (Optional) or Identifiers

Team names must be appropriate. The coordinator reserves the right to change names at any time and without notice.

3. Communication Efforts

Throughout the season and playoffs, the coordinator may contact teams and/or individuals on multiple occasions.

4. Rules of the Game

Playoffs—All teams will advance to the playoffs. Playoffs will be set up according to standards.

5. The Draft

The draft will be held at a TBD date before the 1st week of the NFL season. Owners will have one minute to make their individual draft selections. All teams will draft a 14-man roster.

All leagues will have a snake draft. The drafts will commence online, so teams must be ready and properly logged in to the league page.

Snake Draft: Team owners participate in each round of the draft by taking turns selecting players in a snake draft format (i.e., 1-12, 12-1, 1-12, etc.). Each team drafts one player per round until all roster slots are full (including bench). Teams will have 90 seconds to make their draft selection each round. Teams will be allowed to auto-pick if they wish to not attend the online draft.

8. Scoring

OFFENSE

Passing Yards: 1 point per 25 yards passing
Passing Touchdowns: 4 points
Interceptions: −2 points
Rushing Yards: 1 point per 10 yards
Rushing Touchdowns: 6 points
Receiving Yards: 1 point per 10 yards
Receiving Touchdowns: 6 points
Fumble Recovered for a Touchdown: 6 points
2-Point Conversions: 2 points
Fumbles Lost: −2 points

KICKING

Point After Touchdown Made: 1 point
Field Goal Made (0-49 yards): 3 points
Field Goal Made (50+ yards): 5 points

DEFENSE TEAM

Sacks: 1 point
Interceptions: 2 points
Fumbles Recovered: 2 points
Safeties: 2 points
Defensive Touchdowns: 6 points
Kick and Punt Return Touchdowns: 6 points
Points Allowed (0): 10 points
Points Allowed (1-6): 7 points
Points Allowed (7-13): 4 points
Points Allowed (14-20): 1 points
Points Allowed (21-27): 0 points
Points Allowed (28-34): −1 points
Points Allowed (35+): −4 points 9. BYE Weeks Throughout some weeks in the season, each NFL team will have designated BYE weeks, which are announced ahead of time. Please be aware when your team's players have BYE weeks.

10. Transactions

There is no limit to the number of transactions during the regular season but a max of 6 per week.

11. Trades

The league participants will be able to vote on all trades.

All participating team captains will have 1 day to protest trade transactions.

There are no trading back players from team to team.

The trade deadline will be announced on the Yahoo website.

Trades are allowed with no limits to the number of trades which can be made. A two-day trade review period will be implemented and four (4) votes are needed to veto any trade.

Trade deadline: Usually slated for late November.

12. Waiver Wire

Following the draft, all free agent players will be acquired via the waiver wire. Teams can make as many waiver claims as they wish throughout the season. There is a one-day waiver review period and the waiver order is determined based on the order of standings.

13. Schedules and Standings

Head-to-head matchups will begin with week one of the NFL regular season, with one matchup completed each week. There will be 13 regular season matchups. Standings will be compiled each week in win-loss format. Points for and points against will also be kept.

14. Postseason

The postseason will begin with week 14 of the NFL regular season.

Four teams will qualify for the postseason. Each playoff matchup will consist of two rounds (i.e. Weeks 14 and 15: Weeks 16 and 17).

All other teams in the league failing to qualify for postseason play will still compete in order to determine final league standing.

These are rules for a standard league with a single coordinator or league manager. The nature of the game allows for limited numbers of teams, and changing of players on the individual teams is difficult, leaving teams with primarily their original picks and poor performance or injuries over the course of the season, frustrating league teams. It would be desirable to enable a different format of fantasy sports play that overcomes these issues. Various attempts have been made to improve upon these general rules and overcome some of the deficiencies, as described below.

US Patent Application Publication 20150057074 (Geller describes a sports fantasy event in which a set of projected performance data for an upcoming performance of real-world athletes is used to create a projected point value corresponding to the projected performance of each real-world athlete. A user of a client device selects one or more athletes that the user deems most likely to improve on their projected points. When the real-world games begin, a difference between the projected fantasy-sports point totals (which may be equalized by providing a handicap) is used to declare a winner of the fantasy-sports game.

U.S. Pat. No. 6,371,855 (Gavriloff) describes a fantasy internet sports game in which a system provides an interactive sports game to a plurality of participants wherein each participant wishes to form a fantasy sports team made up of actual players. The system is operable: (a) to solicit and accept from each participant an initial selection and purchase of players to form the participant's fantasy sports team, each participant purchasing the players using no more than a predetermined number of game value units initially allocated by a host controller; and (b) responsive to a request of a participant, to access the data storage and report a status of the participant's fantasy team, the status including information as to the performance and market value of the players on the participant's team. The number of game value units associated with each player varies in correlation with the demand of the participants for that player and a participant receives periodically a value-based reward correlated to the value and/or performance of the players on a participant's team. US Patent Publication 20150209679 (Givant) discloses systems and methods for conducting fantasy sports tournaments are disclosed. A particular embodiment includes at least four key features that should be in the same tournament structure to produce an effective tournament. These features include the following: 1) entry fees must be a nominal (e.g., low cost, low risk for the consumer) cost to the consumer so the masses can afford to play; 2) the grand prize must be a multi-million dollar offering so the masses will enthusiastically desire to play; 3) participants must not be subjected to playing the entire field at the same time to discourage the masses (i.e., the tournament must be skill based); and 4) there must be a re-entry component that allows fantasy players an option to continue getting back into the tournament for as long as possible.

US Patent Publication 20150057074 (Geller) describes a set of projected performance data for an upcoming performance of real-world athletes is used to create a projected point value corresponding to the projected performance of each real-world athlete. A user of a client device selects one or more athletes that the user deems most likely to improve on their projected points. When the real-world games begin, a difference between the projected fantasy-sports point totals (which may be equalized by providing a handicap) is used to declare a winner of the fantasy-sports game.

US Patent Publication 20150011298 (Haid) discloses a method of conducting a fantasy event. The method comprises acquiring information for one or more members of one or more fantasy teams participating in the fantasy event, automatically selecting one or more portions of audio, visual, and/or audio/visual content stored in an electronic memory device using the acquired information, and generating a playback program using the selected content that reenacts at least a portion of the fantasy event. Separately or in combination, the method comprises assigning a point enhancer to a member of a fantasy team in response to a user input, the enhancer serving to enhance the fantasy point total of that team member, acquiring information corresponding to the team member, and determining, based on the information and on the enhancer, a point total for the team member in accordance with a scoring scheme. Also provided is a system for implementing the method.

U.S. Pat. No. 10,290,185 provides a system and method for paramutual-style fantasy sports wagering and entertainment. In one exemplary embodiment, the present invention can include a method for paramutual fantasy betting, the method comprising providing a bettor with a first plurality of players of a first player type, providing a bettor with a second plurality of players of a second player type, receiving a proposition from the bettor, wherein the proposition comprises a first player from the first plurality of players and a second player from the second plurality of players, receiving a wager amount from the bettor, receiving a paramutual bet for the proposition, calculating paramutual odds for the proposition, and determining a result for the bettor, wherein the result is based on the paramutual bet and the proposition.

U.S. Pat. No. 9,943,766 (Balsbaugh) discloses methods and systems for establishing fantasy sports competitions. In one aspect, a method includes generating fantasy team rosters, each fantasy team roster including distinct individual athletes, where each fantasy team roster is balanced to the other fantasy team rosters based on historical data from a database of computed fantasy sports statistics and a database of predictive modeling of projected individual fantasy sports statistics; receiving selected teams within the at least two fantasy team rosters from users; obtaining real-time statistics of the athletes; creating a dynamic database including fantasy scoring of the athletes based on a fantasy scoring scheme; and displaying in real time the dynamic database comparing the fantasy sports statistics for each fantasy team roster to determine which fantasy team roster has amassed higher scoring fantasy sports statistics based on the fantasy scoring scheme.

U.S. Pat. No. 8,670,847 (Sloan) discloses a method and device are for fantasy sport applications including receiving a plurality of ranking values associated with a sport player; assigning a corresponding weight value to each ranking value; determining a score value as a function of the ranking value and the corresponding weight value; determining a final ranking value as a function of the score values for the sport player; and generating a recommendation for the sport player as a function of the final ranking value.

U.S. Pat. No. 9,056,257 (Moore) provides a first list of available players to each individual user who then selects a first fantasy lineup, where selections by another individual user does not preclude other individual users from also selecting the same player. First fantasy lineups are received from each individual user, the fantasy lineups comprising one or more players selected from the first list of available players. Each individual user may provide a replacement lineup prior to the end of a game. A subsequent list of available players is provided to each user and does not include players from the first fantasy lineup. Subsequent fantasy lineups from each individual user are received comprising only players selected from the subsequent list of available players. None of the players of the first fantasy lineup for an individual user is included in any subsequent fantasy lineup of the individual user.

These references evidence systems, components, software and principles that can be used as background in practicing the novel execution of a fantasy sports event according to the present invention. Each cited document is incorporated herein by reference in its entirety. In spite of the technical support these references provide, the present invention provides a novel and unique technology enhancing fantasy sports activity.

SUMMARY OF THE INVENTION

A method of executing a sports fantasy wagering event among multiple players executed through player terminals to one or more servers, each of the player terminals including: one or more processors; player input controls; a communications component to connect the player terminal to a gaming platform running on the one or more servers; wherein the sports fantasy event is a single player game competing against multiple other single players that is dependent upon verifiable sports event outcomes in sports events; wherein each of the players select individual sports players or sports team performances, even if other ones of the multiple players have selected same individual sports players or sports team performances; and the one or more servers generate an amended point outcome based on reducing numbers of points awarded to each of the multiple players inversely based on numbers of the players having selected any identical performance.

DETAILED DESCRIPTION OF THE INVENTION

A method of executing a sports fantasy wagering event among multiple players executed through player terminals to one or more servers, each of the player terminals including one or more processors; player input controls; a communications component to connect the player terminal to a gaming platform running on the one or more servers; a display to depict action into and from an interactive gaming session directed to a sports fantasy event, wherein the interactive game is a single player competing against other single players that is dependent upon verifiable sports event outcomes in sports event where all wagers must be placed before a first sports event from among at least ten sports events begin. The player selects or enters sports event selections for the verifiable sports event outcomes by defined individual sports players or sports team performances selected from the group consisting of players at specific positions, team defensive performance and team offensive performance through the player input controls. Each of the multiple players selecting a predetermined number of outcomes for the defined individual sports players performance or sports team performances. Each of the multiple players may be used to and do select any of the defined individual sports players or sports team performances, even if other ones of the multiple players have selected ones of the defined individual sports players or sports team performances. Upon occurrence of verifiable outcomes for the defined individual sports players performance or sports team performances, points are awarded to each of the multiple players based on performance with respect to the verifiable outcomes for the defined individual sports players performance or sports team performances. The one or more servers a memory having instructions stored thereon that when executed by the one or more processors cause the player terminal to generate an amended point outcome based on reducing numbers of points awarded to each of the multiple players inversely based on numbers of the players having selected any identical individual sports players performance or sports team performances.

The method and apparatus and a system enabling the method may include a monetary wager is placed through the player input controls and monetary payouts are authorized by the one or more servers to individual players based upon accumulation of points from the amended point outcomes for the individual players.

The method may include an amended point outcome A based on reducing numbers of points awarded to each of the multiple players inversely based on numbers of the players having selected any identical individual sports players performance or sports team performances is determined by determining total numbers of the multiple players N, the total number of each individual sports players performance or sports team performance, and multiply points P awarded on any identical individual sports players performance or sports team performances S, the number of selections made on each of the individual sports players performance or sports team performance O according to $A = P \times O/N$ such that increased selection of an identical individual sports players performance reduces amended points awarded to each of the numbers of selections O.

Simple examples of this process include, for example, a sports fantasy football gaming event including a single week (Sunday through Saturday) wherein the selections are made. If there are, for example, 10,000 individual players, and 5,000 select Tom Brady of New England as quarter back (hereinafter Player A), 2,000 select Aaron Rogers of Green Bay (hereinafter player B), and Player C has 1000 selections, Player D has 500 selections, Player E has 500 selections, Player F has 200 selections, Player G has 200 selections, Player H has 150 selections, Player I has 100 selections, Players J, K and L has 100 selections, and Player M has 50 selections.

The following table will indicate the amended points a player would receive when an absolute number of points according to the traditional point method provided in the Background of the Art is used.

| PLAYER | Selections | POINTS | Amended Pts. |
| --- | --- | --- | --- |
| A | 5/10 | 21 | 42 (10/5 x 21) |
| B | 2/10 | 16 | 80 (10/2 x 16) |
| C | 1/10 | 10 | 100 (10/1 x 10) |
| D | 0.5/10 | 9 | 180 (10/0.5 x 9) |
| E | 0.5/10 | 0 | 0 (10/0.5 x 0) |
| F | 0.2/10 | 11 | 550 (10/0.2 x 11) |
| G | 0.2/10 | 3 | 150 (10/0.2 x 3) |
| H | 0.15/10 | 6 | 400 (10/0.15 x 6) |
| I | 0.10/10 | 12 | 1,200 (10/0.1 v 12) |
| J | 0.10/10 | 8 | 800 (10/0.1 x 8) |
| K | 0.10/10 | 9 | 900 (10/0.1 x 8) |
| L | 0.10/10 | 6 | 600 (10/0.1 x 6) |
| M | 0.05.10 | 9 | 1,800 (200 x 9) |

As can be seen, this literal amending of the points, lesser picked players can produce significantly higher amended points, even though performing much worse than greater picked players. This literal amending of points can provide incentive towards selection of lesser performing players. This literal mending can be too highly distorted, but gives significant incentive for fantasy sports players to select traditionally lower valued players or teams. This high distortion can be easily corrected, and still provide this incentive towards lower valued players by adding an absolute value to all player selections/For example, all players can be assumed to have a minimum number of 10% of selections, or in the case of 10,000 absolute players, at least 500 players are added to each players actual numbers of selections, or 1000 players are added to each players actual numbers of selections, or 1000 players.

This impact is evidenced below with respect to more limited numbers of players in the example with 1,000 players (termed herein as "an equivalating number") added to each players actual selections.

| PLAYER | Selections | POINTS | Amended Pts. |
| --- | --- | --- | --- |
| A | (5 + 1)/10 | 21 | 35 (10/6 x 21) |
| C | (1 + 1)/10 | 10 | 50 (10/2 x 10) |
| I | (1 + 0.10)/10 | 12 | 109.(10/1.1) v 12) |
| M | (1 + 0.05)/10 | 9 | 85 (10/1.05) x 9) |

Larger equilibrating numbers such as 1,500, 2,000, and 3,000 (or more) can also be used, which would have a similar impact as follows, using a 2,000 balancing base as the equilibrating number.

| PLAYER | Selections | POINTS | Amended Pts. |
| --- | --- | --- | --- |
| A | (5 + 2)/10 | 21 | 30 (10/7 x 21) |
| C | (1 + 2)/10 | 10 | 33.3 (10/3 x 10) |
| I | (2 + 0.10)/10 | 12 | 57.1.(10/2.1) v 12) |
| M | (2 + 0.05)/10 | 9 | 43.9 (10/2.05) x 9) |

Using a 2,000 equilibrating number.

| PLAYER | Selections | POINTS | Amended Pts. |
| --- | --- | --- | --- |
| A | (5 + 4)/10 | 21 | 23 (10/9 x 21) |
| C | (1 + 3)/10 | 10 | 25 (10/4 x 10) |
| I | (3 + 0.10)/10 | 12 | 39.9 (10/3.1) v 12) |
| M | (3 + 0.05)/10 | 9 | 29.5 (10/3.05) x 9) |

As can be seen, the use of larger equilibration numbers brings more player or team selections into a greater state of equivalence, the objective of this amended point operation.

Additionally, absolute limits on the amending multiplication factor (e.g., the 2+0.10) can be limited to an absolute value such as 2.0, 2.5, or 3.0 to protect against an otherwise extreme effect, as where out of 10,000 players, one player would select a particular player or team outcome, and provide an amending multiplication factor of 10,000×1.

The method may sports events providing the verifiable outcomes for the defined individual sports players performance or sports team performances that are limited to a time frame of seven days or less, so that there are frequent opportunities to change underlying wagers. Entire seasons or only playoff seasons (e.g., the NCAA basketball bracket) may be used. A printer at the player terminal may print out a sports event ticket identifying the individual sports players performance or sports team performances selected by an individual player, and a number identifying a total of all individual players making an identical selection, or an electronic-only record can be made. For example, a ticket may show that out of 10,000 selections Team A was selected by 36% of all of the multiple players to have an over/under of total points scored in a game of 54 points.

It is desirable that all selections provide a balancing base of a at least 10%, preferably at least 20% and more preferably at least 25% or at least 30% of the total number of participants in the sports fantasy gaming event. For example, again using 10,000 participants as the example, every player selection would start with a phantom balancing base number of 1,000 (10%), 2,000 (20%), 2,500 (25%) or 3,000 (30%) selections assumed in all future calculations to be made. This would prevent extreme outcome results for players selected by very few participants. On the other hand, such extreme potentials, with lower (1%, 2%, 5%, or 0%) balancing bases promote extreme selections of players by participants and can add to the excitement of the sports fantasy short-term (single day, single week, 2-4 week) play of the sports fantasy contests.

The one or more individual sports players performance or sports team performances may be football sports game parameters selected from the group consisting of points scored, yardage made, points allowed, and sacks.

The method may be used wherein the one or more individual sports players performance or sports team performances are baseball sports game parameters selected from the group consisting of runs batted in, total runs, strikeouts, hits and walks. The method may also be used wherein the one or more individual sports players performance or sports team performances are basketball sports game parameters selected from the group consisting of points scored, three-point plays, fouls, free throws and personal fouls.

Reference to the Figures will assist in a further appreciation of the present invention.

Figure 1:
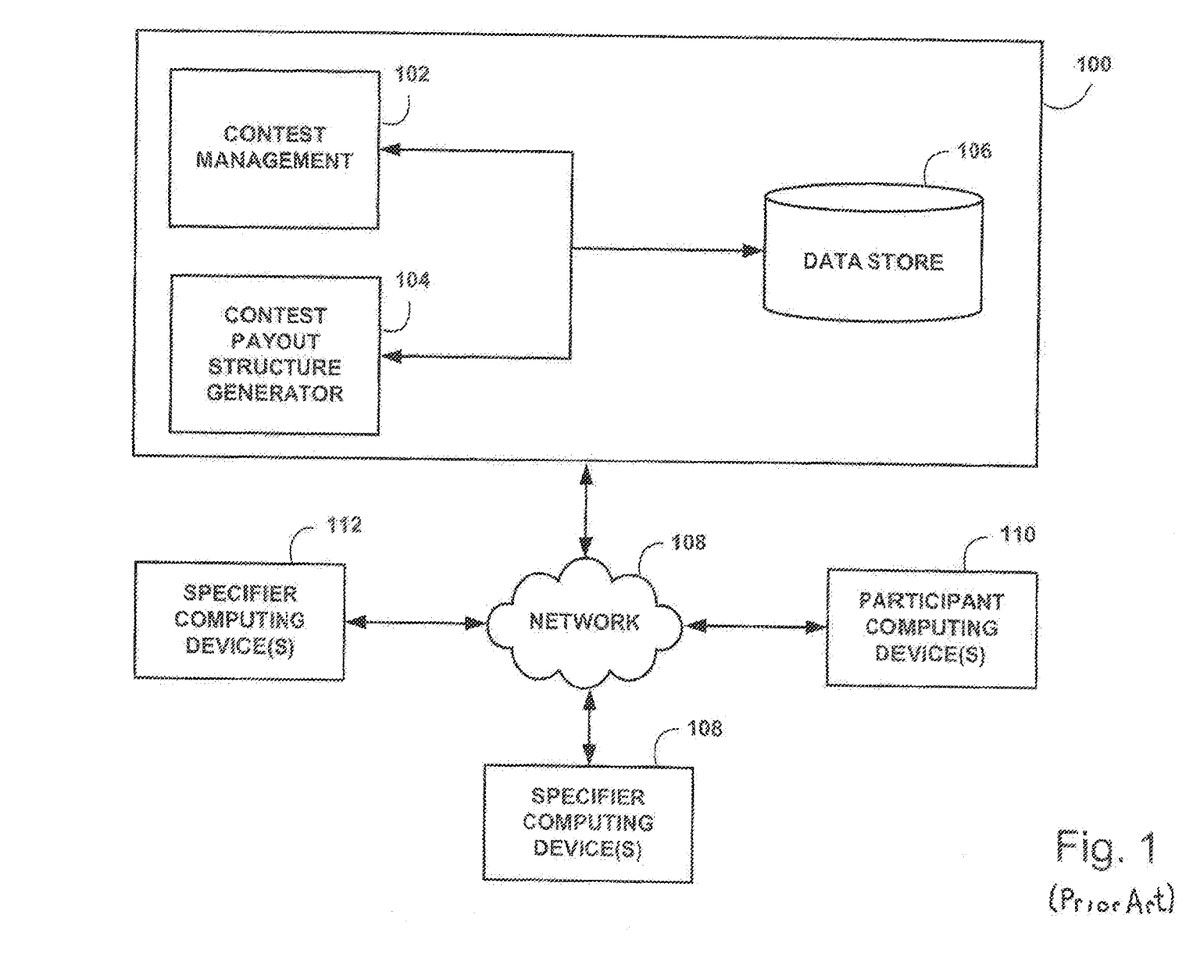
FIG. 1 provides an illustration of components, including contest generation and payout components, in accordance with one or more embodiments of the present disclosure.

FIG. 1 provides an illustration of components, including contest generation and payout components, in accordance with one or more embodiments of the present disclosure.

As shown in FIG. 1, in accordance with one or more embodiments, system 100 can receive input from a contest specifier, contest provider and contest participants, or other users of system 100. With respect to a contest provider, system 100 can receive configuration information (e.g., available selections such as players, teams, outcomes, statistical selections, etc.), which may be submitted as a configuration file, input via a user interface (e.g., terminal, processor, smart phone, tablet, etc.) such as might be provided using one or more web pages, fillable pages, informational text and other viewable matter useful in executing the fantasy gaming events. The configuration specified by the provider can comprise such information as the types of contests to be offered by the system 100 on the provider's behalf, and, for each contest type, one or more contest creation and/or management parameters. For example, and without limitation, a contest provider, contrary to typical fantasy sports events where a system may provide only raw selections (names, teams, positions, events, etc.), without typical draft prices or initial values for the selections (prices for players, teams, events, etc.), n, specifying a number of identical contests, which may be referred to herein as contest instances, of the given type to create at the start of a given contest generation period, and the parameter, m, specifying a maintenance level. The parameters can vary from one contest configuration to another, and the parameters may be dynamically altered by contest manager 102.

It is important to understand at this point a significant difference in the execution of the present technology. Practitioners of the fantasy sports event (the wagering players) make their selections of their preferred teams, which are selected in their entirety through the player input functions in the system 100. Individual players will know their selections, but there is no publication or notice to other players of any state of the selection. The importance of this will be clearly shown. Final results of all selections will be publicly announced, displayed or published only upon closing of all wagers in a specific contest. Additional contests may be opened when one contest is closed (because of predetermined limits, such as 10,000 participants), if there are sufficient available participants. Again, all individual selections and collections of selections and total selections must be maintained in confidence until close of any other contest.

Selection results can be held by the contest manager 102 until closing of an individual contest. Electronic forms may be saved by participants (and of course retained by the contest manager 102) and printable copies may also be provided to participants. Additional information such as total numbers of participants in a contest, numbers of selections on each individual selectable player or event or categories, can be available to allow participants to evaluate potential outcomes and track statistical outcomes. This can increase interest during each contest as success of advantaged selections can be tracked.

The parameters affecting value of individual selections (as detailed above) will be revealed to individual and collective players only upon close of a contest. As explained above, these will depend on the number of actual participants.

In accordance with one or more embodiments, contest manager 102 automatically creates the number, n, instances of the contest type at the start of a contest generation period. System 100 monitors contest instances and determines whether or not a contest instance is closed, e.g., a contest is closed when the number of participants reaches capacity, e.g., the number of participants signed up to participate in a contest instance reaches the allowed number of participants for the contest instance, or a specific time limit is reached. In addition, contest manager 102 makes a determination whether the number of unfilled contest instances of a contest falls below a minimum requirement. If contest manager 102 determines that the number of unfilled contest instances falls below a predetermined value, the contest manager 102 can automatically create a number of new contest instances to bring the number of unfilled contest instances to a required minimum and/or the total number of participants adjusted in the calculations. In determining whether or not to create the changes, contest manager 102 uses the contest generation period, the end of which may be identified based on a specified contest start time parameter or total number of players, to determine whether or not to create a new contest instance.

By ensuring that at least the maintenance number of instances of a contest type is offered at any given time, contest manager 102 is able to adjust to user demand, and can do so without user intervention. The contest manager 102 will monitor, calculate, analyze and interpret all selection outcomes, of course after receiving verifiable outside input of the real sports events.

In accordance with one or more embodiments, the contest manager 102 may be configured to automatically update the system parameters, such as number of players, individual player selections and the like.

In accordance with one or more such embodiments, contest manager 102 may even make a determination to limit individual selection values (multipliers) at the time of publication or release, as where only a single selection was made for a player out of 10,000 possible selections. This is optional, but desirable. The limit may be to an absolute value (e.g., 10,000/1,000) or an absolute specific multiple such as 3× for all selections wherein the value of 10,000/total specific selections exceeds 3.0 to make the absolute selection 3×.

In accordance with one or more embodiments, payout structure generator 104 determines or executes software of a structure to be used to divide a contest's prize pool among the winning contest participants. In accordance with at least one such embodiment, payout structure generator 104 generates a payout structure that apportions a prize pool among the winning contest participants such that the exact amount of the prize pool is apportioned to the contest winners and the prize amounts satisfy monotonicity of prizes, which ensures that the first place, or ranked, prize amount is at least as much as the second place prize amount, which is at least as much as the third place prize amount and so on. It is also possible to structure awards based on extremely high point result outcomes. For example, where a statistical average winning point total is 300 fantasy sport points, totals of over 350, over 400 or over 500 can be awarded a special award out of the total investment in the fantasy sport contest. For example, if with 10,000 participants with a $100 fantasy sport wager/participant, a standard first place award might be $50,000, a bonus award could be $55,000, or any other number greater than $50,000. The additional amount might be deducted from management fees, or deducted from second-fifth place awards.

In accordance with one or more such embodiments, the prize amounts are rounded to a nice number while ensuring that the total amount of the payout apportioned to the winners is equal to the total prize pool. In accordance with one or more embodiments, payout structure generator 104 is configured to use as input the total prize pool, the number (and even quality) of winners, the first prize amount and the entry fee and generates a prize payout structure.

In accordance with one or more embodiments, payout structure generator 104 selects tentative prize amounts, e.g., using a power law distribution, defines a mathematical optimization problem to generate a payout structure and satisfy problem conditions, or constraints, (monotonicity, roundness of payouts, total budget, number of winners) in generating the payout structure. Of course, it should be apparent that any approach may be used to define tentative prizes, such as and without limitation exponentially or logarithmically declining tentative prize generation approaches.

In accordance with one or more embodiments, the payout structure generator 104 uses a formal-number criteria for generating a payout structure comprising aesthetically pleasing prize amounts to be displayed with a contest instance. By way of a non-limiting example, a prize amount of $10,000.00 is preferable to $10,012.11. By way of a further non-limiting example, a prize amount can be rounded up or rounded down to a formal whole number amount.

FIG. 9 illustrates some processing and communication components useful in connection with one or more embodiments of the present disclosure.

Figure 1A:
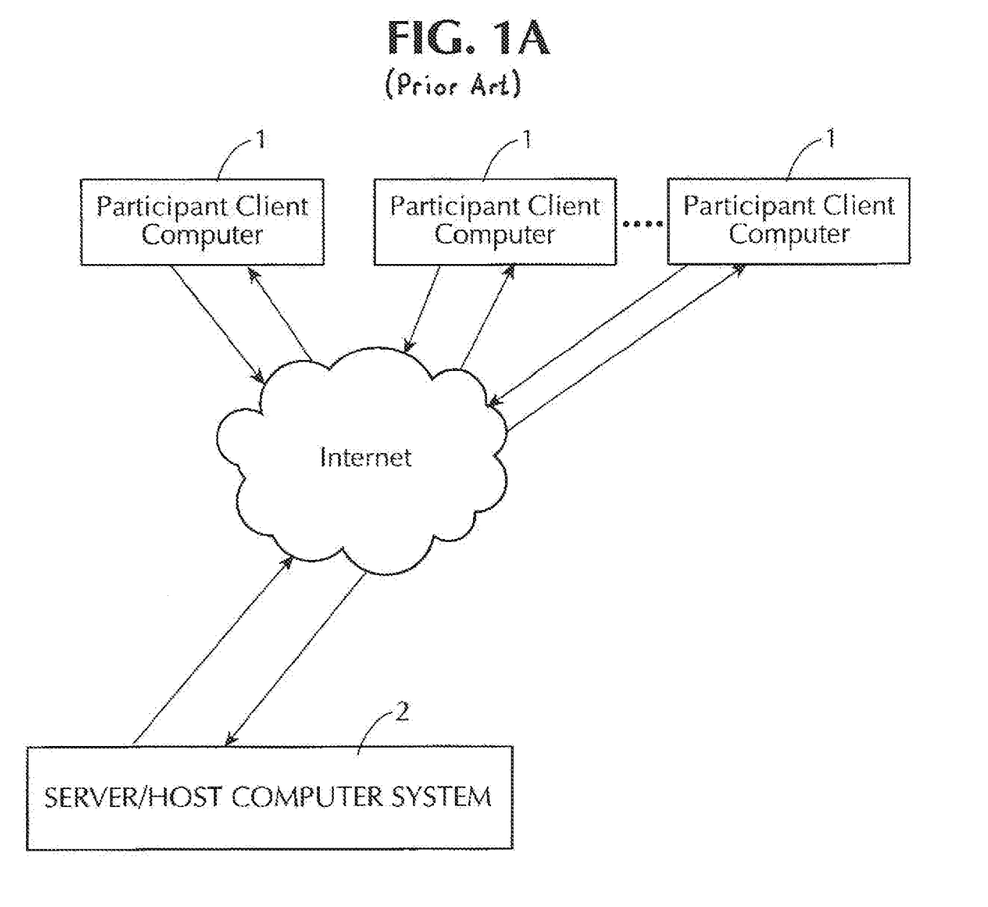
FIG. 1A (Prior Art) is a block diagram showing an Internet-based hardware implementation of general fantasy sports games, including those of the present invention.

An example of a generic Internet-based hardware and systemic implementation of the present invention is shown in FIG. 1A (Prior Art). As shown in the figure, game participants operating client computers 1 communicate with the Web server computer 2 of the game administrator, preferably by visiting and interacting with the Web site located on the server. This process is typically initiated by the participant typing, into his or her browser, the Uniform Resource Locator (URL) of the server Web site. In response to receipt of this communication from a participant's browser, software operating in the server computer 2 controls the server to send the browser the game's home page form, preferably a Hypertext Mark-up Language (HTML) document, having a menu of options to be discussed below. An interactive session ensues, which will be described in detail below with reference to a preferred embodiment, allowing the participant to register as a coach, select a team, and monitor the progress of his or her team, among other things.

The server computer 2 is programmed to format data, accessed from local or remote databases or other sources of data, for presentation to the participant, preferably in the format discussed in detail below. The server computer 2, although described herein in the singular, may actually comprise plural computers cooperating to perform the functions described herein.

The server computer programming can utilize any conventional Web data interface technique or techniques, such as Common Gateway Interface (CGI) protocol and associated applications (or "scripts"), or Java "servlets", i.e., Java applications running on the Web server. It will be appreciated that the interactive forms to be discussed below, which present forms for entry of information by the participants, and which save the entered information to a database, may be implemented in any of several conventional ways, using known server applications. For example, in response to entry of the participant's name and password, the server can redirect the information to a CGI application that is called when the participant clicks, for example, a "submit" icon. Access to databases, both local and remote, containing for example game information or information as to current sports results, also may be implemented, for example, by other CGI or similar applications.

When a participant uses his or her browser to visit the Web site of the game organizer, a game home page appears. The home page offers the participant several options, implemented preferably as hypertext links, as to how to proceed. The options are shown in the flowchart of FIG. 1B.

Figure 1B:
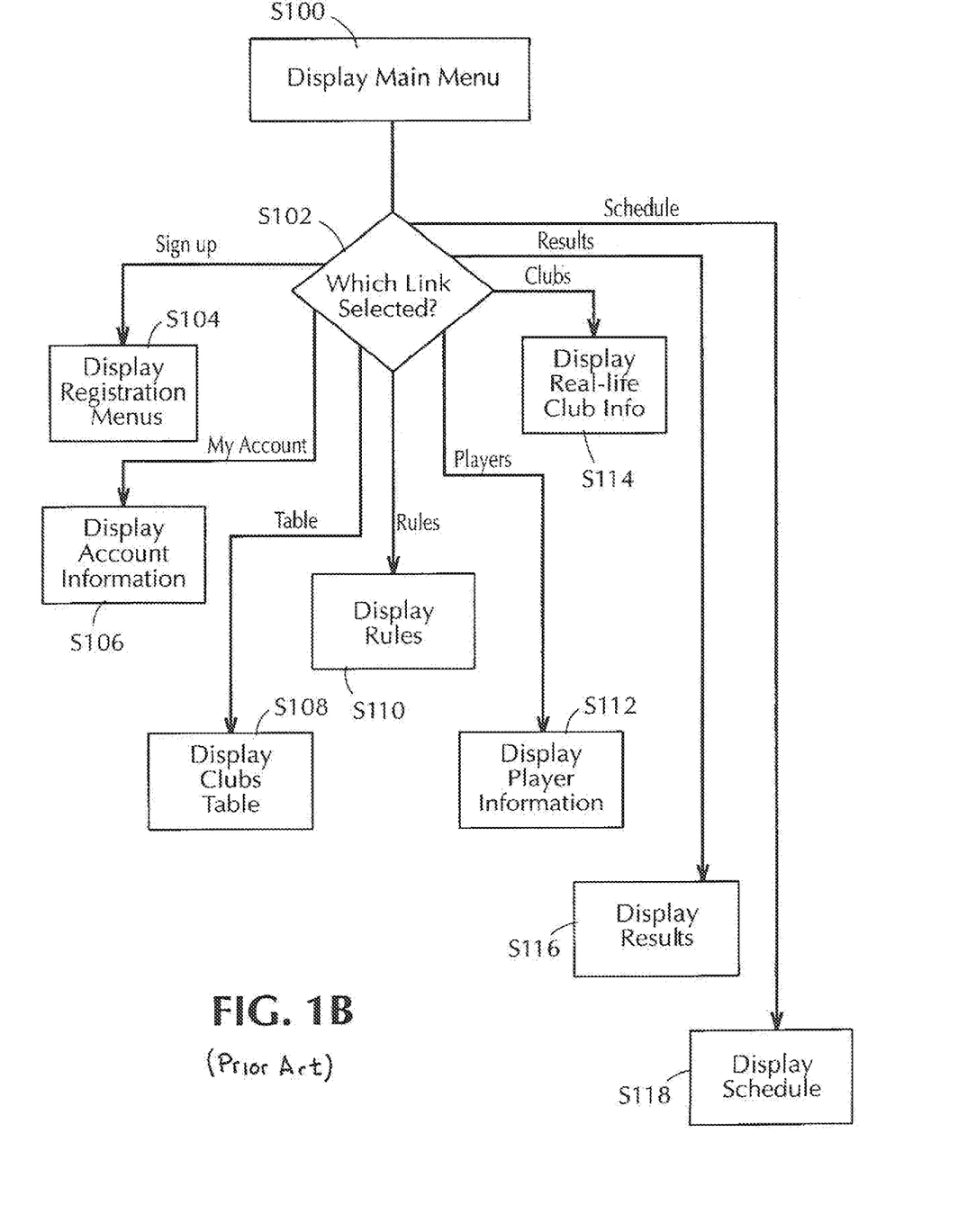
FIG. 1B (Prior Art) is a flow diagram illustrating the flow of operation from a main menu of fantasy sports games, including those of the present invention depending upon which of several links is selected.
Figure 2:
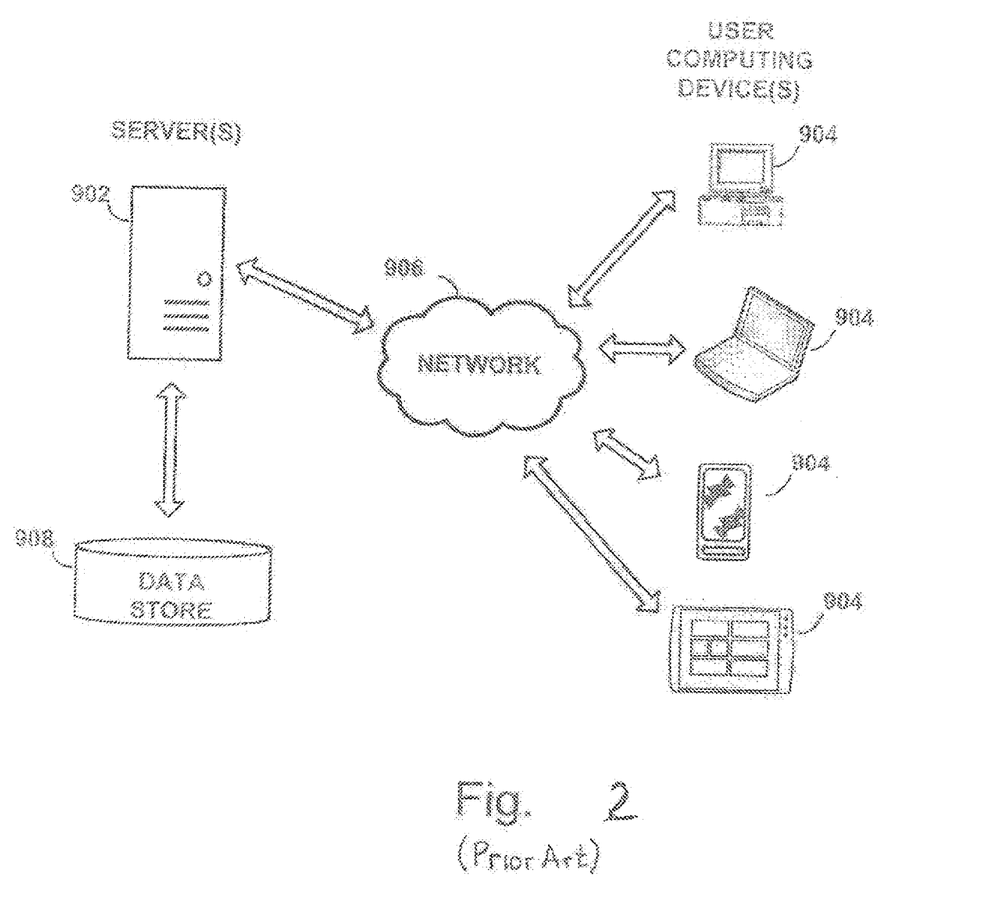
FIG. 2 illustrates some processing and communication components useful in connection with one or more embodiments of the present disclosure.

As shown in FIG. 1B, in response to the participant visiting the game web site, by for example entering the web site's URL into his or her browser, a home page of the game Web site is presented to the participant. The home page of the game Web site presents a visiting participant, or potential participant, with a menu of several links, at step S100. An example of a home page in accordance with a preferred embodiment of the present invention is shown in FIG. 2.

Depending upon which link is selected, a host computer program decides, at step S102, which screens, preferably HTML pages or the like, to display to the participant next.

If the participant clicks the "sign up" link, flow proceeds to step S104, at which Web server software running on the host computer of the game Web site causes HTML pages (with selection identifiers, rules, and other ancillary information) to be transmitted, in the order and manner convenient to the participants. If the participant clicks the "my account" link, flow proceeds to step S106, at which software running on the server computer causes additional screen shots with, for example, account information and wagering amount information to be transmitted, in an order and manner convenient to the participant.

If the link "Table" is selected, flow proceeds to step S108, at which point the Web server will transmit an HTML page having a list of already registered fantasy clubs or open contests or filled contests (for informational purposes) to be displayed. If the link "Rules" is selected, the Web server will transmit, at step S110, an HTML page having a copy of the rules of the game in accordance with the present invention.

If the link "Players" is selected, the Web server will transmit, at step S112, and HTML page having a listing of information about players eligible for selection in the fantasy sports game, even though all players in the underlying sports events are available.

If the link "Clubs" or "Open Contests" is selected, the Web server will transmit, at step S114, an HTML page with information relating to actual real-life fantasy sports contests on which the participants are still able to select players eligible for selection in the game play.

If the link "Results" is selected, the Web server will transmit, at step S116, an HTML page having results of matches in real-life sports fantasy games of actual contests.

If the link "Schedule" is selected, the Web server transmit, at step S118, an HTML page (not shown) listing the schedule for the current season or specific contest (e.g., one week of play, two weeks of play, up to multiple weeks of play, but not necessarily including an entire season of the real life teams in the contest. Although a complete season (with or without championship play) can be used in the practice of the present technology, It is highly preferred to have shorter duration fantasy sports game contests used, such as one week, two weeks and up to a maximum of four weeks. Without the shorter duration wagering contests, the frustration prevalent in full season contests would return. The shorter term contests also adds to the volatility differences from week-to-week in execution of this sports fantasy gaming event.

FIG. 2 (Prior Art) illustrates a generic system including some general and specific components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 902 can be configured to execute program code, instructions, etc. to provide functionality in accordance with one or more embodiments of the present disclosure. The same or another computing device 902 may be configured to execute program code to implement functionality in accordance with one or more embodiments of the present disclosure.

Computing device 902 can serve content to user computing devices 904 via a network 906 for display at the computing devices 904 using a browser application, for example. User computing devices 904 can include without limitation devices 108, 110 and/or 112. Data store 908, which can include data store 106, can be used to store program code to configure a server 902 to functionality in accordance with one or more embodiments of the present disclosure.

The user computing device 904 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition can be specified using any of a number of languages, including without limitation a markup language such as Hypertext Markup Language, scripts, applets and the like. The user interface definition can be processed by an application executing on the user computing device 904, such as a browser application, to output the user interface on a display coupled, e.g., a display directly or indirectly connected, to the user computing device 904.

In an embodiment the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, T4 or T5 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, $4^{th}$ or 5th generation (2G, 3G, 4G or 5G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long-haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 9. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

What is claimed:

1. A method of executing a sports fantasy wagering event among multiple participants executed through participant terminals to one or more servers, each of the participant terminals comprising:
one or more processors;
player input controls;
a communications component to connect the participant terminal to a gaming platform running on the one or more servers;
a display to depict action into and from an interactive gaming session directed to a sports fantasy event, wherein the interactive game is a single participant competing against other single participants that is dependent upon verifiable sports event outcomes in sports event where all wagers must be placed before a first sports event from among at least ten sports events begin;
wherein the participant selects or enters through the player input controls sports event selections for the verifiable sports event outcomes by defined individual sports players or sports team performances selected from the group consisting of sports players at specific positions, team defensive performance and team offensive performance through the participant input controls;
each of the multiple participants selecting a predetermined number of outcomes for the defined individual sports players performance or sports team performances;
wherein each of the multiple participants may select any of the defined individual sports players or sports team performances, even if other ones of the multiple participants have selected ones of the defined individual sports players or sports team performances; and
upon occurrence of verifiable outcomes for the defined individual sports players performance or sports team performances, points are awarded by the one or more servers to each of the multiple participants based on performance with respect to the verifiable outcomes for the defined individual sports players performance or sports team performances;
the one or more servers having a memory and the memory having instructions stored thereon that when executed by the one or more servers causes the one or more servers to generate an amended point outcome based on reducing numbers of points awarded to each of the multiple participants inversely based on numbers of the participants having selected any identical individual sports players performance or sports team performances;
wherein a monetary wager is placed through the participant input controls and monetary payouts are authorized by the one or more servers to individual participants based upon accumulation of points from the amended point outcomes for the individual sports players; and
wherein sports events providing the verifiable outcomes for the defined individual sports players performance or sports team performances are limited to sports players performance or sports team performances that occur within a time frame of seven days or less and wherein the amended outcome is provided by establishing a single and equal balancing base number of selections to at least one individual sports players' position performance or sports team performance.

2. The method of claim 1 wherein the amended point outcome A based on reducing numbers of points awarded to each of the multiple sports players inversely based on numbers of the participants having selected any identical individual sports players performance or sports team performances is determined by determining total numbers of the multiple participants N, the total number of each individual sports players performance or sports team performance, and multiply points P awarded on any identical individual sports players performance or sports team performances S, the number of participant made on each of the individual sports players performance or sports team performance O according to $A = P \times O/N$ such that increased selection of an identical individual sports players performance reduces amended points awarded to each of the numbers of participant selections O.

3. The method of claim 1 wherein sports events providing the verifiable outcomes for the defined individual sports players performance or sports team performances are limited to sports players performance or sports team performances that occur within a time frame of seven days or less.

4. The method of claim 2 wherein sports events providing the verifiable outcomes for the defined individual sports players performance or sports team performances are limited to sports players performance or sports team performances that occur within a time frame of seven days or less.

5. The method of claim 1 wherein a printer at the participant terminal prints out a sports event ticket identifying the individual sports players performance or sports team performances selected by an individual participant, and a number identifying a total of all individual participants making an identical selection.

6. The method of claim 1 wherein the one or more individual sports players performance or sports team performances are football sports game parameters selected from the group consisting of points scored, yardage made, points allowed, and sacks.

7. The method of claim 1 wherein the one or more individual sports players performance or sports team performances are football sports game parameters selected from the group consisting of points scored, yardage made, points allowed, and sacks.

8. The method of claim 5 wherein the one or more individual sports players performance or sports team performances are sports game parameters selected from the group consisting of points scored, yardage made, points allowed, and sacks.

9. The method of claim 1 wherein the one or more individual sports players performance or sports team performances are baseball sports game parameters selected from the group consisting of runs batted in, total runs, strikeouts, hits and walks.

10. The method of claim 1 wherein the one or more individual sports players performance or sports team performances are basketball sports game parameters selected from the group consisting of points scored, three-point plays, fouls, free throws and personal fouls.

11. The method of claim 1 wherein selecting a predetermined number of outcomes for the defined individual sports players performance or sports team performances is made from a pool of known outcomes for the defined individual sports players performance or sports team performances.

12. The method of claim 6 wherein selecting a predetermined number of outcomes for the defined individual sports players performance or sports team performances is made from a pool of known outcomes for the defined individual sports players performance or sports team performances.

13. The method of claim 7 wherein selecting a predetermined number of outcomes for the defined individual sports players performance or sports team performances is made from a pool of known outcomes for the defined individual sports players performance or sports team performances.

14. A method of executing a sports fantasy wagering event among multiple participants executed through participant terminals to one or more servers, each of the participant terminals comprising:
- one or more processors;
- player input controls;
- a communications component to connect the participant terminal to a gaming platform running on the one or more servers;
- a display to depict action into and from an interactive gaming session directed to a sports fantasy event, wherein the interactive game is a single participant competing against other single participants that is dependent upon verifiable sports event outcomes in sports event where all wagers must be placed before a first sports event from among at least ten sports events begin;
- wherein the participant selects or enters through the player input controls sports event selections for the verifiable sports event outcomes by defined individual sports players or sports team performances selected from the group consisting of sports players at specific positions, team defensive performance and team offensive performance through the participant input controls;
- each of the multiple participants selecting a predetermined number of outcomes for the defined individual sports players performance or sports team performances;
- wherein each of the multiple participants may select any of the defined individual sports players or sports team performances, even if other ones of the multiple participants have selected ones of the defined individual sports players or sports team performances; and
- upon occurrence of verifiable outcomes for the defined individual sports players performance or sports team performances, points are awarded by the one or more servers to each of the multiple participants based on performance with respect to the verifiable outcomes for the defined individual sports players performance or sports team performances;
- the one or more servers having a memory and the memory having instructions stored thereon that when executed by the one or more servers causes the one or more servers to generate an amended point outcome based on reducing numbers of points awarded to each of the multiple participants inversely based on numbers of the participants having selected any identical individual sports players performance or sports team performances, wherein a monetary wager is placed through the participant input controls and monetary payouts are authorized by the one or more servers to individual participants based upon accumulation of points from the amended point outcomes for the individual sports players, and wherein sports events providing the verifiable outcomes for the defined individual sports players performance or sports team performances are limited to sports players performance or sports team performances that occur within a time frame of seven days or less and wherein the amended outcome is provided by establishing a balancing base number of selections to each and every individual sports players performance or sports team performance, and that balancing base is equal at least 10% of the total number of participants in the sports fantasy wagering event.

15. A method of executing a sports fantasy wagering event among multiple participants executed through participant terminals to one or more servers, each of the participant terminals comprising:
- one or more processors;
- player input controls;
- a communications component to connect the participant terminal to a gaming platform running on the one or more servers;
- a display to depict action into and from an interactive gaming session directed to a sports fantasy event, wherein the interactive game is a single participant competing against other single participants that is dependent upon verifiable sports event outcomes in sports event where all wagers must be placed before a first sports event from among at least ten sports events begin;
- wherein the participant selects or enters through the player input controls sports event selections for the verifiable sports event outcomes by defined individual sports players or sports team performances selected from the group consisting of sports players at specific positions, team defensive performance and team offensive performance through the participant input controls;
- each of the multiple participants selecting a predetermined number of outcomes for the defined individual sports players performance or sports team performances;
- wherein each of the multiple participants may select any of the defined individual sports players or sports team performances, even if other ones of the multiple participants have selected ones of the defined individual sports players or sports team performances; and
- upon occurrence of verifiable outcomes for the defined individual sports players performance or sports team performances, points are awarded by the one or more servers to each of the multiple participants based on performance with respect to the verifiable outcomes for the defined individual sports players performance or sports team performances;
- the one or more servers having a memory and the memory having instructions stored thereon that when executed by the one or more servers causes the one or more servers to generate an amended point outcome based on reducing numbers of points awarded to each of the multiple participants inversely based on numbers of the participants having selected any identical individual sports players performance or sports team performances, wherein a printer at the participant terminal prints out a sports event ticket identifying the individual sports players performance or sports team performances selected by an individual participant, and a number identifying a total of all individual participants making an identical selection.

16. The method of claim 15 wherein a monetary wager is placed through the participant input controls and monetary payouts are authorized by the one or more servers to individual participants based upon accumulation of points from the amended point outcomes for the individual sports players, and wherein a printer at the participant terminal prints out a sports event ticket identifying the individual sports players performance or sports team performances selected by an individual participant, and a number identifying a total of all individual participants making an identical selection.

17. The method of claim 16 wherein the amended point outcome A based on reducing numbers of points awarded to each of the multiple players inversely based on numbers of the participants having selected any identical individual sports players performance or sports team performances is determined by determining total numbers of the multiple participants N, the total number of each individual sports players performance or sports team performance points P, and multiply points P awarded to participants on any identical individual sports player's performance or sports team performances S, the number of selections made on each of the individual sports players performance or sports team performance O according to $A=P \times O/N$ such that increased selection of an identical individual sports players performance reduces amended points awarded to each of the numbers of selections O, and wherein a printer at the participant terminal prints out a sports event ticket identifying the individual sports players performance or sports team performances selected by an individual participant, and a number identifying a total of all individual participants making an identical selection.

18. The method of claim 17 wherein the one or more individual sports players performance or sports team performances are football sports game parameters selected from the group consisting of points scored, yardage made, points allowed, and sacks.

19. A method of executing a sports fantasy wagering event among multiple participants executed through participant terminals to one or more servers, each of the participant terminals comprising:
   one or more processors;
   player input controls;
   a communications component to connect the participant terminal to a gaming platform running on the one or more servers;
   a display to depict action into and from an interactive gaming session directed to a sports fantasy event, wherein the interactive game is a single participant competing against other single participants that is dependent upon verifiable sports event outcomes in sports event where all wagers must be placed before a first sports event from among at least ten sports events begin;
   wherein the participant selects or enters through the player input controls sports event selections for the verifiable sports event outcomes by defined individual sports players or sports team performances selected from the group consisting of sports players at specific positions, team defensive performance and team offensive performance through the participant input controls;
   each of the multiple participants selecting a predetermined number of outcomes for the defined individual sports players performance or sports team performances;
   wherein each of the multiple participants may select any of the defined individual sports players or sports team performances, even if other ones of the multiple participants have selected ones of the defined individual sports players or sports team performances; and
   upon occurrence of verifiable outcomes for the defined individual sports players performance or sports team performances, points are awarded by the one or more servers to each of the multiple participants based on performance with respect to the verifiable outcomes for the defined individual sports players performance or sports team performances;
   the one or more servers having a memory and the memory having instructions stored thereon that when executed by the one or more servers causes the one or more servers to generate an amended point outcome based on reducing numbers of points awarded to each of the multiple participants inversely based on numbers of the participants having selected any identical individual sports players performance or sports team performances, wherein the amended outcome is provided by the one or more servers establishing a balancing base number of selections to each and every individual sports players performance or sports team performance, and that balancing base is equal at least 10% of the total number of participants in the sports fantasy wagering event.

* * * * *